United States Patent [19]
Stann

[11] 3,840,876
[45] Oct. 8, 1974

[54] TRANSISTOR DOPPLER DETECTOR FOR LOOP TYPE OSCILLATOR

[75] Inventor: Barry L. Stann, Hyattsville, Md.

[73] Assignee: The United States of America as represented by the Secretary of the Army, Washington, D.C.

[22] Filed: Apr. 27, 1973

[21] Appl. No.: 355,127

[52] U.S. Cl. .................................................. 343/8
[51] Int. Cl. ............................................. G01s 9/46
[58] Field of Search .......................................... 343/8

[56] References Cited
UNITED STATES PATENTS

| | | | |
|---|---|---|---|
| 3,126,539 | 3/1964 | Mulvey | 343/8 |
| 3,394,373 | 7/1968 | Makrancy | 343/8 |
| 3,599,197 | 8/1971 | Boyko | 343/8 X |
| 3,670,328 | 6/1972 | Mardon et al. | 343/8 |
| 3,703,722 | 11/1972 | Gershberg | 343/8 X |

*Primary Examiner*—Malcolm F. Hubler
*Attorney, Agent, or Firm*—Edward J. Kelly; Saul Elbaum

[57] ABSTRACT

A loop type oscillator is electrically and physically connected with a transistor detector to form a doppler detection network. A single loop is used to radiate RF energy from the oscillator, which is returned to the loop after reflection from an object. The transistor detector stage employs a sample section of the loop as an inductance between the base and emitter terminals thereof. A detector output resistor converts doppler perturbations to a voltage for processing by further utilization means.

5 Claims, 3 Drawing Figures

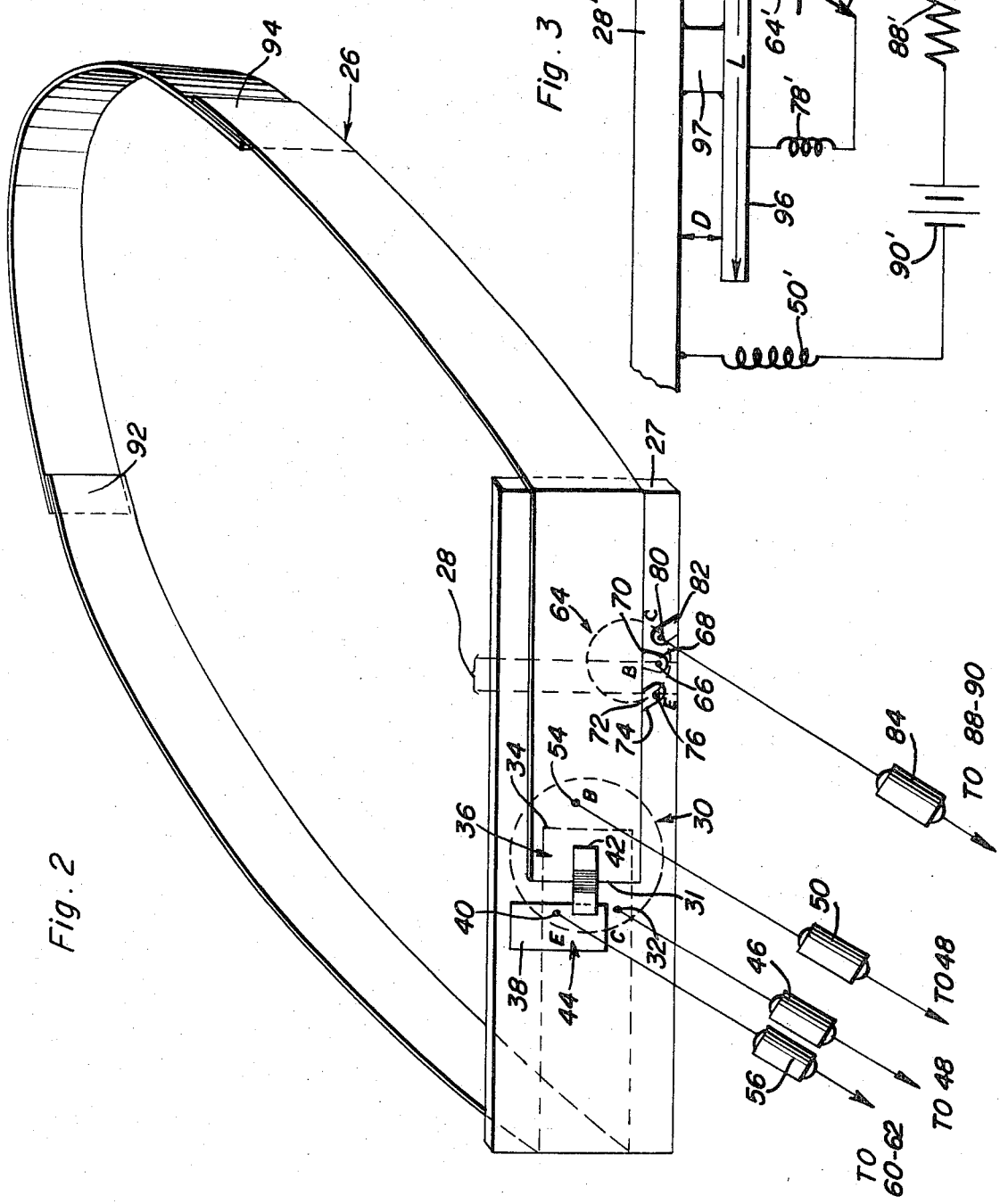

TRANSISTOR DOPPLER DETECTOR FOR LOOP TYPE OSCILLATOR

RIGHTS OF THE GOVERNMENT

The invention described herein may be manufactured, used, and licensed by or for the United States Government for governmental purposes without the payment to me of any royalty thereon.

FIELD OF THE INVENTION

The present invention relates to transistor detectors, and more particularly to an R.F. detector to be used in conjunction with a loop type oscillator. The combination of oscillator and detector is used to detect the doppler effect of a moving object that houses the oscillator-detector circuits.

BRIEF DESCRIPTION OF THE PRIOR ART

In order to measure changes in distance between a moving object, such as a missile and a second object, such as the ground, the doppler effect is employed. In the case of missiles, doppler is utilized to detonate a missile when proximity to a target occurs.

In the past, loop type oscillators have been used to radiate R.F. energy to a target. Reflection from the target is picked up by the loop of the oscillator and detected by a detector circuit which measures perturbations due to received doppler. The perturbations are processed by other utilization means so that range and speed of the missile can be computed relative to a target. In the past, a hot carrier diode peak detector has been used in a UHF loop type oscillator. A hot carrier diode detector is a generally satisfactory approach. However, a fairly large sample segment of the loop must be connected to the detector in order to provide a sufficient detector signal. As a result, the detector influences the loop current which deteriorates overall system performance.

BRIEF DESCRIPTION OF THE PRESENT INVENTION

The present invention utilizes a transistor doppler detector that is connected in circuit with a loop type oscillator, the two circuits being connected to the same loop. The transistor doppler detector has provided a superior alternative to the prior art hot carrier diode peak detector, as used as in UHF loop type oscillators. The transistor detector has exhibited promise of having low cost, wide bandwidths, low noise output, wide selection of output impedance, high sensitivity and high-isolation from the oscillator.

The present invention offers a cost saving when compared to the previous hot carrier diode peak detector because an inexpensive general purpose transistor can be used. The sampling loop section required to operate the transistor detector, and giving an output comparable to a diode, is much smaller than the section required when using the hot carrier diode peak detector.

A distinct advantage of the present invention over the prior art is excellent decoupling of the detector from the loop because of the small sample section required for connection. This results in less disruption of oscillator performance. The short sampling length and short connecting leads further diminishes problems with parasitic resonances that can cause the detection process to be frequency sensitive. Wide bandwidth and low noise output is attributable to low input and output impedances of the circuit.

It is to be emphasized that the present invention may be applied to R.F. peak detection in any system where there exists sufficiently high R.F. reference currents that can be used to turn on the detector transistor.

The above-mentioned objects and advantages of the present invention will be more clearly understood when considered in conjunction with the accompanying drawings, in which:

BRIEF DESCRIPTION OF THE FIGURES

FIG. 2 is perspective view illustrating the physical embodiment of the invention.

FIG. 3 is an alternate embodiment of the detector that is used in the present invention.

DETAILED DESCRIPTION OF THE INVENTION

Figure 1:
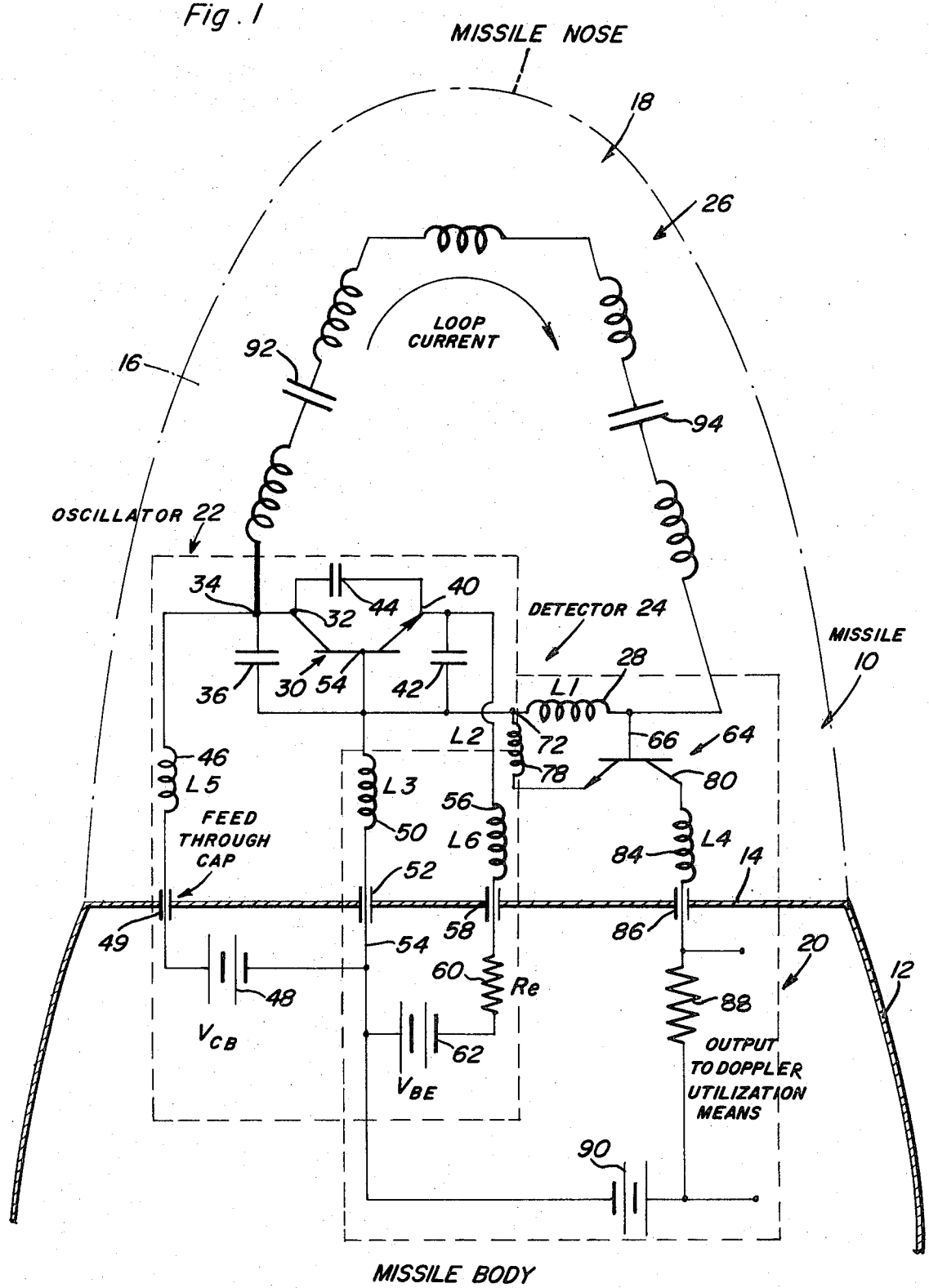
FIG. 1 is an electrical schematic diagram illustrating the circuitry of the loop oscillator and detector, that form the present invention.

Referring to the figures and more particularly, FIG. 1 thereof, reference numeral 10 generally indicates the outline of the nose portion of a missile. The missile body 12 has a transverse end wall 14 that extends forwardly to a missile cone 16 (dotted lines). The R.F. oscillator and detector circuits of the invention are mounted within the nose cone portion as generally indicated by reference numeral 18. The output from the invention, which contains doppler information as well as further information processing circuits (not shown), are situated on the opposite side of the transverse wall 14. The location of the doppler circuits is generally located at reference numeral 20.

The R.F. producing circuit is the loop type oscillator 22 that is connected with the loop 26. The oscillator 22 generates loop current at R.F. that is radiated. Reflections are received by the loop 26 and detected by the detector 24 that has a small sample section of the loop connected as an inductance in the detector circuit. The oscillator operates continuously to generate a R.F. signal that is radiated by the loop. The detector also operates continuously to detect doppler. When radiated signals are reflected back to the loop, a perturbation results in loop current which is detected. The perturbation is detected and fed to further processing circuits (not shown), which are not the subject matter, per se, of the present invention, but which does constitute prior art.

If, for example, the present circuitry was housed within a bomb type missile, the loop would radiate R.F. toward the ground. The R.F. reflected from the ground induces a loop current resulting in the doppler perturbation.

As indicated in FIG. 2, the loop is a conductor band that is thin and typically has a one-fourth inch width and a length typically ranging between two and four inches. In FIG. 1, the loop has been represented by an equivalent series of inductances, one small segment of the loop being indicated by inductor 28. This inductance is the result of the loop sample segment that is physically connected between the base and emitter terminals of the detector transistor, as will be explained hereinafter. Typically, this segment is a fraction of an inch. Because this segment is so small, the present invention enjoys the distinct advantage of excellent decoupling from the loop. More particularly, by using such a small loop sample section, the detector does not disturb the oscillator and resultant system performance. Utilization of this small loop section normally results in bandwidth that is greater than experienced by the prior art hot carrier diode peak detector discussed previously.

Reference is made to FIG. 2 wherein the physical construction of the invention will be briefly described.

Referring to FIG. 2, the loop 26 extends outwardly from a support plate 27 that is comprised of insulative material. The right end of the loop, as viewed in FIG. 2, is attached to the front surface of the support plate 27. The left end of the loop is attached to the rear surface of the plate 27. The right end of the loop has its end edge indicated by reference numeral 31. The left end portion of the loop has its end edge indicated by 34. The right and left end portions of the loop 26 have an overlapping area generally indicated by reference numeral 36. However, these areas are separated by the insulating material of support plate 27. A transistor 30 is mounted to the rear side of the support plate 27. The transistor 30 is physically positioned in registry with the overlapping loop ends 36. Actual connections to the terminals of the transistor will be discussed hereinafter. The detector transistor is generally indicated by reference numeral 64. The transistor is also mounted on the rear side of the support plate 27 and terminals of the transistor are connected across a small length of the loop, as indicated by 28. Typically, this length is a fraction of an inch, such as one half or one quarter inch. Particular connections to the terminals of transistor 64 will be discussed hereinafter.

FIG. 2 illustrates the connection of the collector 32 of transistor 30 to the left end portion of loop 26. This is indicated in FIG. 1 as well. FIG. 1 also indicates the connection of capacitor 36 between the collector 32 and the base 54 of transistor 30. This capacitance is due to the space between loop ends 31 and 34. As will be recalled, the insulating material of support plate 27 separates these two loop ends. In FIG. 2, a flat conductor patch 38 is shown mounted to the front side of support plate 27. The emitter terminal 40 of transistor 30 extends forwardly through the support plate and is suitably connected to the patch 38. A feed back capacitor 42 is connected between the patch 38 and the right end of loop 26, which is also attached to the front side of plate 27. The capacitor 42 is indicated in its electrical equivalent connection in FIG. 1. A feed back capacitor 44 is illustrated in FIG. 1 as being connected between the collector 32 and emitter 40 of transistor 30. The capacitance of 44 is due to the capacitance created between patch 38 and the left end of the loop 26, to which the collector 32 of capacitor 30 is connected. In addition, intrinsic capacitance contributes to the capacitance 44.

The collector 32 is connected through an R.F. choke 46 to a power supply 48. The choke 46 is used to suppress the passage of R.F. current to the doppler circuitry located on the opposite side of the separator wall 14. In actuality, openings 49 are provided in the separator wall 14 to permit feeding through four leads connecting the oscillator and detector transistors to their respective power supplies. As a result, shunt capacitances are created between the feed through openings and the leads passing therethrough. As previously mentioned, the wall 14 serves as a shield to keep R.F., generated by the oscillator-detector from the doppler circuitry located below the wall 14. The shunt or feed through capacitor 49 serves as an additional means for diverting R.F. current from the circuitry below the separator wall 14. A small residual R.F. current that makes it through the R.F. choke 46 will be diverted to the separator wall 14 by the feed through capacitor 49.

A second R.F. choke 50 is connected between the base 54 and the power supply 62, through the feed through capacitance 52. For the reasons just set forth, R.F. will be suppressed by choke 50 and capacitor 52. As a result, lead 54 which extends below the separator wall 14 will be free of R.F.

Similarly, a R.F. choke 56 is connected between the emitter 40 of transistor 30 and a first end of emitter resistor 60. A feed through capacitor 58 exists between the choke 56 and the resistor 60. The opposite end of the resistor 60 is connected to the power supply 62. As will be noticed from FIG. 1, base 54 of the oscillator transistor 30 is directly connected to the right end portion of the loop 26. The left end portion 34 of the loop is connected to collector 32.

In operation of the oscillator 22, the circuit is self-starting due to the presence of spurious signals. Some of the collector output is fed back to the emitter and a regenerative feed back is thus established.

In FIG. 1, the detector transistor is indicated by 64. As previously mentioned, FIG. 2 indicated the physical disposition of this transistor to the rear side of the support plate 27. In FIG. 1, the base 66 is connected to one point of a loop sample segment via a terminal lug 68 which is shown, in FIG. 2, to be directly connected to a point 70 which constitutes the right end of the loop sample 28. The left end of the loop sample 28 is defined through point 72 which is directly connected to the terminal lug 74. This lug connects the emitter 76 of the transistor 64. FIG. 1 illustrates the electrical equivalent of these connections. As will be noted, an inductance 78 exists between the loop sample 28 and emitter. This inductance is due to the transistor case and connection inductances. As shown in both FIGS. 1 and 2, the collector 80 of the detector transistor is connected to an output resistor 88, via R.F. choke 84. As in the case of the other R.F. chokes, choke 84 is connected to the shunt feed through capacitor 86. The output resistor 88 changes current perturbations, due to doppler, to voltage perturbations that consitute input signals to further droppler processing equipment that is not shown. This type of equipment, as previously mentioned, is prior art and does not constitute the present invention, per se.

As shown in FIGS. 1 and 2, loop capacitors 92 and 94 are serially connected at space points along the loop 26. The purpose of these capacitors is to maximize impedance matching thus effecting maximum power radiation from the loop. The loop capacitors are formed by breaking the loop at the spaced points and then splicing the broken ends in overlying relationship, with an insulator sheet therebetween.

FIG. 3 illustrates an alternate detector to be used in place of the detector 24 if extreme loop currents cause the loop sample to be small and the collector current hard to properly adjust. In FIG. 3, those circuit components and elements corresponding with those shown in FIG. 1 are indicated by primes. The sampling loop section 28' has a metal support connected thereto which mounts a conductor strip 96 in spaced parallel relation to the loop sample 28'. The distance between these members is indicated by D, while the length of the conducting strip is indicated by L. A metal support 97 furnishes an electrical feed back path between the detector and the oscillator. Loop current in the loop sample 28' induces current in the conducting strip 96 due to magnetic coupling of the loop sample and the strip. In addition, capacitive coupling exists between the loop sample 28' and the conducting strip 96. As a result of the mentioned magnetic and electric coupling, a current is induced in the conducting strip 96, running parallel to the current in the loop sample 28'. The magnitude of the induced current, at the mid point of the strip 96 can be reliably controlled by adjusting the dimensions D and L.

By using the alternate embodiment for the detector, the current in detector transistor 64' can be adjusted to effect decoupling from the loop.

To summarize the operation of the detector 24, a large R.F. loop current flows in the inductor 28. The voltage developed across that inductor turns on the detector transistor 64 for positive polarity signals, with respect to the base-emitter junction of the transistor. The transistor switches off for a signal of opposite polarity. This results in an R.F. and D.C. current flowing in the transistor's collector circuit. The D.C. current changes linearly with small changes in magnitude of R.F. current flowing in the loop circuit. Consequently, the transistor acts to detect the changes in the magnitude of R.F. current in the loop. The R.F. component of the collector output is filtered off by the indicated R.F. chokes. The resistor 88 in the collector path effectively converts the D.C. collector current perturbations into voltage changes that are processed by doppler equipment (not shown).

The loop sample length is depicted in the region between one eighth –one half inch. Samples of this length do not tend to disturb the oscillator's performance, even with radical changes in the load resistor 88. Variation of the sample length can change the value of D.C. collector current from approximately 2 to 30 ma. This ability allows the use of a wide selection of load resistors in the collector path, that may be chosen to control gain output impedance, and bandwidth of the detector circuit. Choice of the detector transistor will also influence the sample length and corresponding performance. In particular, transistors with high Ft's tend to provide more gain. In most cases, the detector output is higher than that which could be obtained using the discussed prior art hot carrier diode over a much larger loop sample. Noise is kept low by the low impedance across the base-emitter junction of the transistor and low values of the collector resistor (typically 1 – 10K).

I wish it to be understood that I do not desire to be limited to the exact details of construction shown and described, for obvious modifications can be made by a person skilled in the art.

What is claimed is:

1. A network for radiating R.F. energy and for detecting doppler from received reflected R.F. signals, the network utilizing a loop radiator connected to oscillator and detector circuits comprising:

an oscillator transistor having base, emitter and collector terminals;

means for connecting the base terminal to one end of the loop;

means connecting the collector to the other end of the loop;

capacitance means connected between the collector and base terminals for providing an R.F. path therebetween;

second capacitance means connected between the emitter and base terminals for providing an R.F. path therebetween;

third capacitance means connected between the collector and emitter terminals for providing a regenerative feed back path therebetween which sustains oscillations in the transistor;

first means connected between the base terminal and a power supply for suppressing R.F. currents beyond the suppressing means;

second means connected between the collector terminals and a power supply for suppressing R.F. currents beyond the suppressing means, and for establishing the proper biasing of the collector and base terminals;

third means connected between the emitter and a power supply for suppressing R.F. currents beyond the suppressing means;

an emitter resistor connected between the third suppressing means and the power supply for establishing proper biasing of the base-emitter terminals;

a detector transistor having base, emitter and collector terminals;

means for connecting the emitter terminal to one end of a sampling section of the loop via an intermediately connected inductance that is present due to the transistor case and the leads connected to the transistor terminals;

means for connecting the base terminal to the other end of the sampling section;

perturbations in current through the sampling section providing an input signal to the detector transistor;

the base terminal of the oscillator transistor connected to a junction defined between the loop sampling section and the intermediately connected inductance for suppressing R.F. current flowing through the first suppressing means;

additional power supply means connected to an opposite end of the third suppressing means for powering the detector transistor;

fourth means connected between the collector terminal of the detector transistor and the additional power supply means via an intermediatly connected load resistor, for converting doppler current perturbations at the collector terminal of the detector transistor to voltage perturbation signals that may be processed by further doppler measurement means.

2. The circuitry as recited in claim 1 together with a missile body for enclosing the oscillator-detector network, the body comprising a central portion having a shielding separator wall for separating the central portion from an attached nose portion;

apertures formed in the wall for permitting the passage of leads therethrough, the leads being connected between the suppressing means and respective power supply means;

the R.F. circuitry being positioned on an opposite side of the wall from the power supplies and the load resistor, the passage of the leads through the apertures forming feed through capacitors that provide respective R.F. shunt paths along the wall which prevents R.F. currents within the nose portion from interferring with doppler circuitry located in the central portion.

3. In a loop oscillator, a mechanical loop structure comprising:

an insulative support plate;

a conductive loop band extending, along its intermediate length, from the support plate;

a first end portion of the band mounted on a first side of the support plate;

a second end portion of the band mounted on a second side of the support plate, in spaced registry with the first end portion, thus creating a first capacitor;

a conductive patch mounted on the second side of the support plate, in spaced registry with the first end portion thus creating a second capacitance;

a third capacitor, functioning as a feedback capacitor, connected between the patch and the second end portion;

an oscillator transistor mounted on the first side of the support in registry with the patch and the first end portion of the band;

the transistor having first, second and third electrodes;

the first and second electrodes respectively connected to the patch and the first end portion of the band for coupling the oscillating transistor to the loop band, the second capacitor having its effect felt across the first and second electrodes;

the third transistor electrode connected to means for generating oscillations in the transistor, the first capacitor making its effect felt between the first and third electrodes;

the third capacitor connected between the second and third electrodes.

4. The subject matter of claim 3 together with a detector transistor mounted on the first side of the support in registry with the second end portion of the band;

the detector transistor having first, second and third electrodes;

means connecting the first and second electrodes across a narrow sampling length of the second end portion of the band for coupling the detector transistor to the loop band; and the third detector transistor electrode connected to means for detecting signals conducted by the loop band.

5. The subject matter of claim 4 wherein the loop band is spliced at least at one point along the length thereof, insulative material mounted between spliced band sections for creating at least one capacitor in series with the inherent inductance of the loop band.

* * * * *